United States Patent
Lin et al.

(10) Patent No.: US 7,602,825 B1
(45) Date of Patent: Oct. 13, 2009

(54) TUNABLE PASSIVELY MODE-LOCKED LASERS WITH PHASE-LOCK FEEDBACK FOR LOW TIMING JITTERS

(75) Inventors: Anthony Hong Lin, Palo Alto, CA (US); Jingjun Zhao, Sunnyvale, CA (US)

(73) Assignee: Calmar Optcom, Inc., Sunnyvale, CA (US)

(*) Notice: Subject to any disclaimer, the term of this patent is extended or adjusted under 35 U.S.C. 154(b) by 0 days.

(21) Appl. No.: 11/223,657

(22) Filed: Sep. 9, 2005

Related U.S. Application Data

(60) Provisional application No. 60/620,497, filed on Oct. 20, 2004.

(51) Int. Cl.
*H01S 3/13* (2006.01)
*H01S 3/30* (2006.01)
*H01S 3/10* (2006.01)
*H01S 3/098* (2006.01)
*H01S 3/04* (2006.01)
*H01S 3/00* (2006.01)

(52) U.S. Cl. .......... 372/30; 372/6; 372/9; 372/18; 372/25; 372/29.011; 372/29.02; 372/33; 372/38.01

(58) Field of Classification Search .......... 372/6, 372/9, 18, 25, 29.011, 29.02, 30, 33, 38.01
See application file for complete search history.

(56) References Cited

U.S. PATENT DOCUMENTS

| | | | |
|---|---|---|---|
| 4,733,397 A * | 3/1988 | Gallagher et al. | ............. 372/26 |
| 4,896,942 A | 1/1990 | Onstott | |
| 4,921,354 A * | 5/1990 | SooHoo | ............. 356/470 |
| 5,008,887 A | 4/1991 | Kafka et al. | |
| 5,136,261 A * | 8/1992 | Lewis | ............. 331/94.1 |
| 5,146,185 A * | 9/1992 | Lewis | ............. 331/3 |
| 5,367,529 A * | 11/1994 | Holsinger et al. | ............. 372/30 |
| 5,367,531 A | 11/1994 | Eguchi | |
| 5,414,725 A | 5/1995 | Fermann | |
| 5,436,925 A | 7/1995 | Lin et al. | |
| 5,440,573 A | 8/1995 | Fermann | |
| 5,448,579 A | 9/1995 | Chang | |
| 5,488,620 A | 1/1996 | Minden | |
| 5,513,194 A | 4/1996 | Tamura et al. | |
| 5,530,582 A | 6/1996 | Clark | |
| 5,617,434 A | 4/1997 | Tamura et al. | |
| 5,627,848 A | 5/1997 | Fermann et al. | |
| 5,644,584 A * | 7/1997 | Nam et al. | ............. 372/20 |
| 6,097,741 A | 8/2000 | Lin | |

(Continued)

OTHER PUBLICATIONS

Lin et al., Adjustment-Free Femtosccond Polarization-Maintaining Fiber Lasers, Technical Digest, pp. 165-166 (1997) No Month.

(Continued)

*Primary Examiner*—Wael Fahmy
*Assistant Examiner*—Hayr A Sayadian
(74) *Attorney, Agent, or Firm*—Fish & Richardson P.C.

(57) ABSTRACT

Techniques and devices to stabilize a passively mode-locked laser against the timing jitter by using a feedback control signal based on a signal component at a high harmonic frequency of the laser pulse repetition frequency in the laser output to control the optical path length of the laser resonator.

11 Claims, 7 Drawing Sheets

U.S. PATENT DOCUMENTS

| | | | |
|---|---|---|---|
| 6,134,003 | A | 10/2000 | Tearney |
| 6,359,915 | B1 * | 3/2002 | Koch et al. ............... 372/29.02 |
| 6,373,867 | B1 | 4/2002 | Lin |
| 6,516,014 | B1 * | 2/2003 | Sellin et al. ................... 372/32 |
| 6,570,892 | B1 | 5/2003 | Lin et al. |
| 6,687,270 | B1 * | 2/2004 | Robertson, III .............. 372/30 |
| 6,785,303 | B1 * | 8/2004 | Holzwarth et al. ............ 372/16 |
| 6,856,640 | B2 * | 2/2005 | Henrich et al. ................ 372/97 |
| 7,190,705 | B2 * | 3/2007 | Fermann et al. .............. 372/18 |
| 2002/0044574 | A1 * | 4/2002 | Abedin ........................ 372/18 |
| 2003/0185255 | A1 * | 10/2003 | Ye et al. ....................... 372/18 |
| 2004/0213302 | A1 * | 10/2004 | Fermann et al. ................ 372/6 |
| 2005/0073689 | A1 * | 4/2005 | Pang et al. .................. 356/450 |
| 2005/0094680 | A1 * | 5/2005 | Takabayashi et al. ......... 372/20 |
| 2006/0198398 | A1 * | 9/2006 | Fermann et al. ................ 372/6 |

OTHER PUBLICATIONS

Lin et al., Saturable Absorber Mode-Locked Er/Yb Fiber Ring Lasers, ECOC European Conference of Optical Communications, pp. 1-4 (1995) No Month.

Reddy et al., A Turnkey 1.5 μm Picosecond Er/Yb Fiber Laser, Optical Fiber Communication Conference, pp. 71-74 (1993) No Month.

De Souza, et al., Saturable Absorber Modelocked Polarisation Maintaining Erbium-Doped Fibre Laser, Electronics Letters, pp. 447-448, (Mar. 4, 1993), vol. 29, No. 5.

* cited by examiner

F = 10.24 GHz +/-0.5%

Principle of pulse laser with tunable repetition rate

Figure 5. Structure of optical delay line

Figure 6 Frequency discriminator and Stage driver

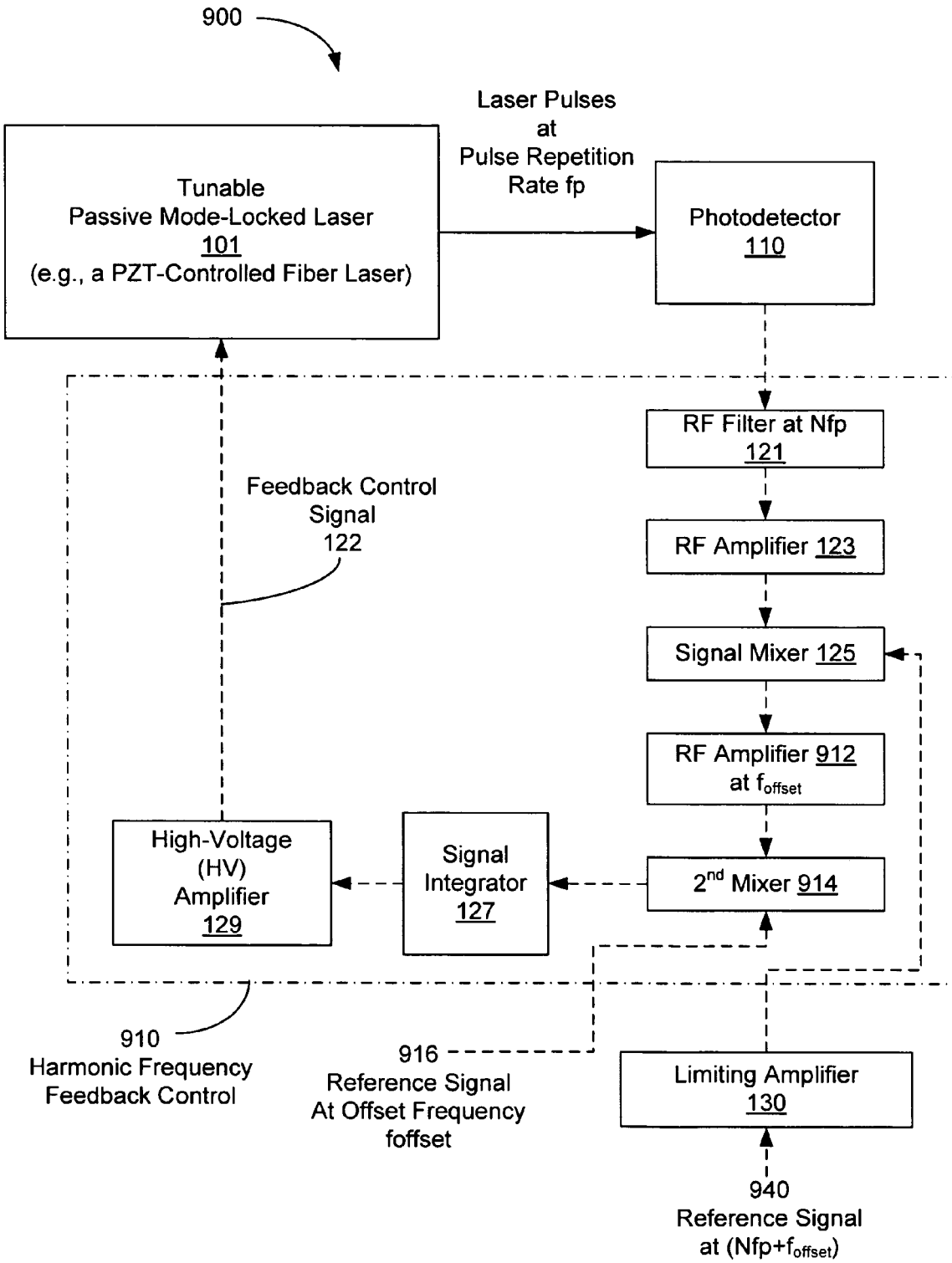

TUNABLE PASSIVELY MODE-LOCKED LASERS WITH PHASE-LOCK FEEDBACK FOR LOW TIMING JITTERS

This application claims the benefit of U.S. Provisional Patent Application No. 60/620,497 entitled "Low Timing Jitter, Fast Tunable Repetition Rate Mode-Locked Fiber Laser Phase Locked to External RF Clock" and filed on Oct. 20, 2004, the entire disclosure of which is incorporated by reference as part of the specification of this application.

BACKGROUND

This application relates to passively mode-locked lasers.

Ultra short optical pulses can be used in various applications including optical information processing and data communication, optical probing with high temporal resolution, laser surgery, and material processing. Mode-locked lasers can be used to generate such ultra short optical pulses. Such a mode-locked laser has a laser resonator to support multiple longitudinal modes that oscillate simultaneously. A mode-locking mechanism is implemented in the resonator to synchronize the phases of different modes and thus to lock these modes. These phase-locked modes constructively add to one another to produce a short laser pulse. Passive mode locking uses at least one nonlinear optical element inside the resonator to produce an intensity-dependent response to an optical pulse so that the pulse width of the optical pulse exiting the nonlinear element is reduced. Commonly used passive mode locking techniques include saturable absorbers, nonlinear fiber-loop mirrors (e.g., figure eight fiber lasers), and intensity-dependent nonlinear polarization rotation. The laser resonator may use various cavity configurations such as linear, ring, and figure-eight geometries.

Passively mode-locked lasers may be configured as fiber lasers where one or more fiber segments are used to transport or guide light in the laser resonator. Fiber lasers have been developed as a new generation of compact, inexpensive and robust light sources. A passively mode-locked fiber laser can be implemented by using an optically-pumped resonator with a doped-fiber as the gain medium. Many different dopants can be used to achieve laser oscillations at different wavelengths. Atomic transitions in rare-earth ions can be used to produce lasers from visible wavelengths to far infrared wavelengths (e.g., 0.45 μm-3.5 μm). Er-doped fiber lasers for producing optical pulses at 1.55 μm are particularly useful for optical fiber communication applications.

The laser pulses from a passively mode-locked laser are periodic in time and the pulse repetition period between any two sequential laser pulses should ideally be a constant. The pulse repetition rate or the pulse repetition frequency is the inverse of the pulse repetition period and is dictated by the optical path length of the laser resonator. In actual fiber and other passively mode-locked lasers, the optical path length of the laser resonator may fluctuate and drift with time due to various factors such as changes in temperature, vibrations and other perturbations. Such fluctuations and drifts in the optical path length of the laser resonator can cause the timing of the laser pulses to vary and such timing variation is commonly referred as timing jitter due to its random nature. Such timing jitter produces phase noise in the laser pulses produced by the passively mode-locked laser and can limit the performance of the laser in various applications. For this and other reasons, the timing jitter is undesirable and should be eliminated or minimized below an acceptable level in various applications.

SUMMARY

This application provides techniques and devices to stabilize a passively mode-locked laser against the timing jitter by using a feedback control signal based on a signal component at a high harmonic frequency of the laser pulse repetition frequency in the laser output to control the optical path length of the laser resonator. In one implementation, for example, a device is described to include a feedback control unit for a tunable passively mode-locked laser whose optical path length of a laser resonator is adjustable. This feedback control unit includes an electronic signal filter to filter frequency components of a train of electronic pulses generated by an optical detector that receives laser pulses from the laser to extract signal spectral components around a harmonic frequency Nfp within a predetermined bandwidth to produce a monitor signal, where N is a positive integer and fp is a pulse repetition frequency of the laser. Signals at the pulse repetition frequency are rejected by the signal filter. The feedback control unit also includes a signal mixer which mixes the monitor signal and a reference signal to produce an error signal representing a timing jitter in the laser pulses from a periodic timing pattern at the pulse repetition frequency fp. The feedback control unit uses the error signal to produce a feedback control signal for adjusting the optical path length of the laser to reduce the timing jitter.

In the above described device, the feedback control unit may further include a signal integrator coupled to receive the error signal from the signal mixer and to integrate the error signal over time to produce the feedback control signal. The harmonic frequency Nfp may be selected with a sufficiently large N to amplify the feedback control signal above the noise of the integrator.

In another implementation, a method is described to include converting laser pulses at a pulse repetition frequency generated from a tunable passively mode-locked laser into electrical pulses, filtering the electrical pulses in frequency to obtain a monitor signal at a harmonic frequency of the pulse repetition frequency without signals at the pulse repetition frequency, mixing the monitor signal with a reference signal at the harmonic frequency to produce a beat signal representing a timing jitter in the laser pulses, and adjusting the laser to change the pulse repetition frequency of the laser pulses in response to the timing jitter to reduce the timing jitter. The harmonic frequency at a harmonic number may be set at a value to amplify a magnitude of the error signal representing the timing jitter by a factor of the harmonic number to be greater than a noise level.

In yet another implementation, a device includes a tunable passively mode-locked laser, an optical detector and a feedback control circuit. The laser includes a laser resonator to produce laser pulses and a laser control mechanism which controls an optical path length of the laser resonator to tune a pulse repetition frequency of the laser pulses. The optical detector is to receive at least a portion of the laser pulses from the laser and to produce electronic pulses in response to the received laser pulses. The feedback control circuit operates to extract a monitor signal whose spectral range centers at a harmonic frequency of the pulse repetition frequency from the electronic pulses and to process the monitor signal to produce an error signal indicating a deviation in timing of the laser pulses from the harmonic frequency of a reference signal. The feedback control circuit applies the error signal to the laser control mechanism which, in response, tunes the pulse repetition frequency of the laser pulses to reduce the deviation. As a result, the timing jitter in the laser pulses is reduced.

These and other implementations and features and their operations are described in greater detail in the attached drawings, the detailed textual description, and the claims.

BRIEF DESCRIPTION OF DRAWINGS

FIG. 9 shows an another example of a passively mode-locked laser where the feedback control uses a frequency offset to reduce 1/f noise in the feedback.

DETAILED DESCRIPTION

Figure 1:
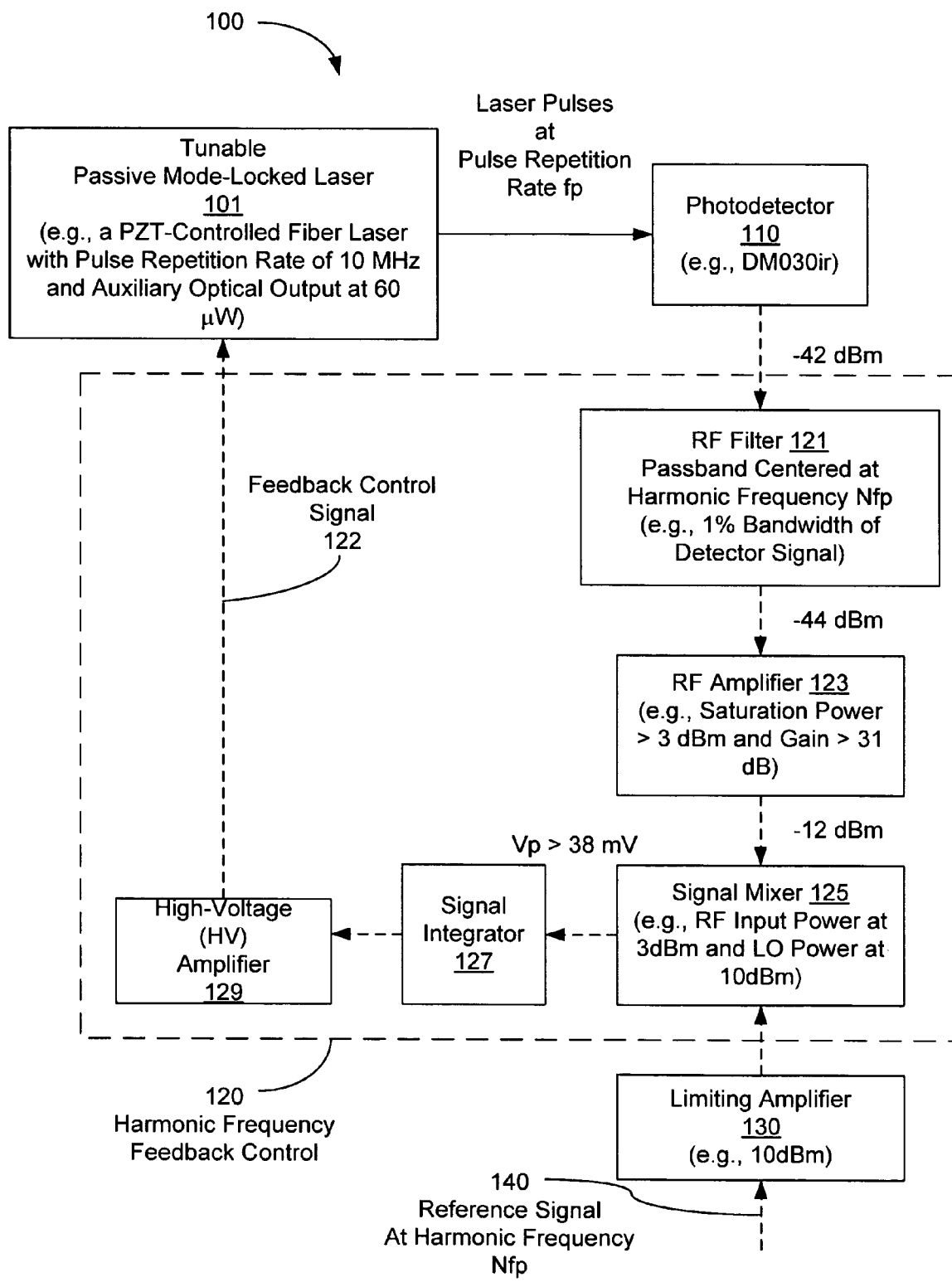
FIG. 1 shows one exemplary system 100 where a feedback control unit is connected to a tunable passively mode-locked laser and uses a feedback control signal based on a signal component at a high harmonic frequency of the laser pulse repetition frequency in the laser output to control the optical path length of the laser.

Timing jitter in passively mode-locked lasers is well recognized as a limitation of such lasers in various applications, including high speed optical sampling. One approach to reducing the timing jitter is to use a phase lock feedback loop to lock the passively mode-locked fiber laser to an external RF clock signal as a master reference signal. As such, the pulse repetition frequency is locked to the clock signal in the master reference signal and its variation caused by fluctuations and drifts in the laser resonator is reduced. In this context, the timing jitter of the passively mode-locked laser is the timing offset between the timing of the laser pulse pulses and that the timing of the clock signal of the reference signal (i.e., the master). The reference signal is used in this phase locking scheme as a timing standard and may have some timing jitter or drift compared to a perfect timing standard such as the atomic clock in NIST. The feedback loop uses a signal mixer as a phase-sensitive detector to mix the electronics pulses converted from the laser pulses by a photodetector and the reference signal at a reference frequency to produce an error signal that reflects the timing jitter. The voltage variation $\Delta V$ produced by the phase-sensitive detector in response to the timing error $\Delta t$ in the laser pulses is $$\Delta V = V_p \cdot \sin(2\pi f \Delta t),$$

where f is the frequency of the reference signal and Vp is the peak amplitude of the voltage of the phase-sensitive detector. Therefore, for a given small timing jitter $\Delta t$, the voltage variation $\Delta V$ increases with the frequency f of the reference signal. When the value of ($2\pi f \Delta t$) is much smaller than $\pi/2$, the voltage variation $\Delta V$ is approximately proportional to the frequency f of the reference signal: $\Delta V = V_p * \sin(2\pi f \Delta t) \approx V_p 2\pi f \Delta t$.

Therefore, when the feedback loop is operated at a low reference frequency, e.g., the laser pulse repetition frequency which may be, for example, between 10 MHz to 100 MHz in some passively mode-locked fiber lasers, the generated voltage variation $\Delta V$ in response to the timing error $\Delta t$ in the laser pulses (1 or 2 ps) may be too small relative to the noise level in the loop for the phase locking to operate effectively. As a specific example, consider a reference signal at f=10 MHz and a phase detector with a peak output of Vp=0.5 V. The error voltage for a timing jitter of $\Delta t$=2 ps is $\Delta V$=0.5*sin(2 pi*10 MHz*2 ps)=$6.28 \times 10^{-5}$ V. Various electronic components in the feedback loop can have noise at or greater than this error voltage when operated at the ambient temperature. This error voltage can be easily buried in the circuit noise in the phase lock loop and the phase locked loop cannot properly lock the laser at its fundamental repetition rate with a very low timing jitter. In this particular example, the phase-locking at the pulse repetition frequency of the laser pulses can suffer a large timing jitter of, for example, 1 or 2 ps, over a time period larger than several seconds in some lasers. Timing jitters at the picosecond level can be too large for various applications that require precise timing of the laser pulses.

One solution to this problem is to reduce the noise level of the feedback loop by using specially designed circuit elements with low noise, cooling the circuit elements to an operating temperature below the ambient temperature to reduce the thermal noise or combining both low-noise circuit elements and the cooling. This approach can be expensive and may also impose restrictions to the feedback loop due to the cooling.

The techniques and devices described in this application are in part based on the recognition that the detector output from a photodetector that converts the laser pulses into electronic pulses includes, among others, signal components at both the pulse repetition frequency (fp) and its harmonic frequencies Nfp, where N is a positive integer greater than 1 (N=2, 3, 4, etc.) is limited by the upper limit of the response frequency of the photodetector. Therefore, when a signal mixer is used in the feedback loop of the passively mode-locked laser to generate the error voltage of $\Delta V = V_p \cdot \sin(2\pi f \Delta t)$ in response to a timing jitter $\Delta t$, the feedback loop can be designed to select a harmonic frequency of the pulse repetition frequency as the reference frequency f for the phase detection to amplify the error voltage $\Delta V$ caused by a small timing jitter. Depending on the noise level in the feedback loop, the harmonic number N for the reference frequency f=Nfp can be set a sufficient high value so that the signal to noise ratio of the error voltage $\Delta V$ is sufficiently large for the phase locking to operate effectively. In the example given above for a phase detector with a peak output of Vp=0.5 V, if the $1000^{th}$ harmonic (N=1000) of the 10-MHz pulse repetition frequency is used as the reference frequency (i.e., f=10 GHz), the corresponding error voltage $\Delta V$ is $6.27 \times 10^{-2}$ V. This signal is about 1000 times grater than the error voltage generated at the pulse repetition frequency of 10 MHz and be used with various commercial circuit elements at the ambient temperature to achieve effective phase locking.

Figure 2:
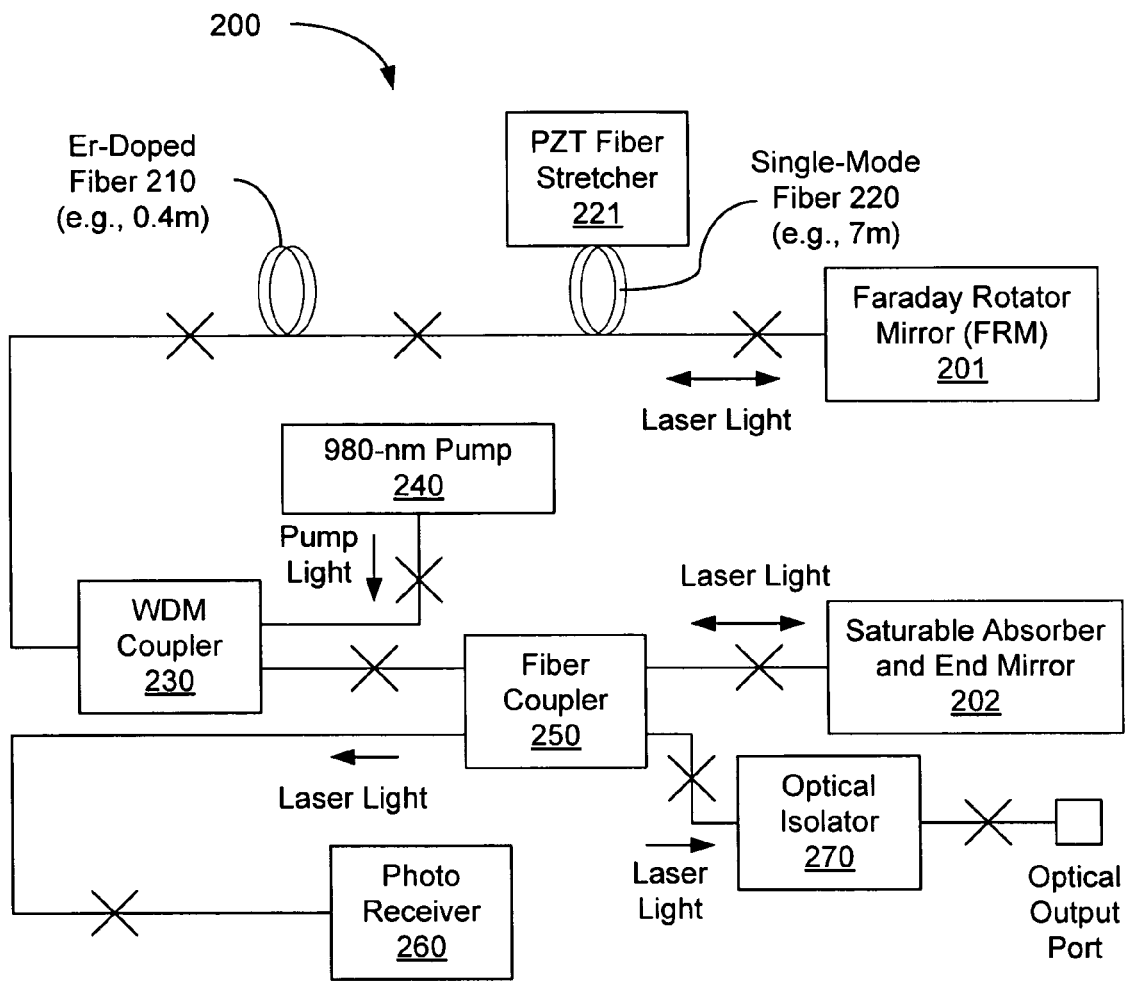
FIG. 2 shows one exemplary fiber laser suitable for implementing the system in FIG. 1, where the laser is tunable Fabry-Perot fiber laser that uses a saturable absorber for passive mode locking.

FIG. 1 shows one exemplary system 100 where a feedback control unit 120 is connected to a tunable passively modelocked laser 101 and uses a feedback control signal 122 based on a signal component at a high harmonic frequency of the laser pulse repetition frequency in the laser output to control the optical path length of the laser 101 for reducing the timing jitter. A photodetector 110 is used to receive the laser pulses from the laser 101 and converts the received laser pulses into an electronic signal with electronic pulses corresponding to the received laser pulses. The photodetector 110 may be a high speed detector with a large bandwidth to produce various harmonics of the pulse repetition frequency, including the harmonic frequency Nfp to be used as the reference frequency of the reference signal 140 for the phase locking. The feedback control unit 120 uses a signal mixer 120 as the phase-sensitive detector to generate the feedback control signal. As a specific exemplary implementation of the system 100, the laser 101 may be a passively mode-locked fiber laser as shown in FIG. 2 operating at a pulse repetition frequency fp of 10 MHz and the phase-locking feedback loop uses a high harmonic such as 10 GHz (i.e., the 1000th Harmonic of the fundamental pulse repetition frequency at fp=10 MHz) as the reference signal frequency for the phase locking. The phase detector 125 can, therefore, produce a large error voltage 1000 times greater than the error signal generated by using a 10-MHz reference signal for the phase detection. With this large error signal based on the 10-GHz harmonic frequency for the phase locking, the phase locked loop can be made to follow the RF clock very closely with very low timing jitters. The fiber laser may be a laser with output pulses with a pulse width of approximately 0.5 ps and a high speed detector with a detection bandwidth greater than 10 GHz may be used to detect the laser pulses and generate an electrical pulse train with a pulse width of about 15~20 ps. The electrical pulses in frequency domain exhibit many harmonics from 10 MHz to about 20 GHz. Instead of using the fundamental harmonic at 10 MHz for the phase detection, a significantly higher harmonics such as 10 GHz (N=1000) or 10.24 GHz (N=1024) may be picked as the reference for the phase detection.

The feedback control unit 120 in the illustrated example includes an electronic filter 121 (e.g., an RF bandpass filter) to filter the signal spectral components at and around the selected harmonic frequency Nfp within its passband while rejecting other spectral components including the signal at the pulse repetition frequency fp. The bandwidth of the passband for the filter 121 may be narrow to limit the signal power of the filtered signal at frequencies other than the selected harmonic frequency Nfp. For example, the bandwidth of the filter 121 may be 1% of the bandwidth of the detector signal from the photodetector. This filtering mitigates the circuit saturation in the subsequent processing at various circuit elements (including the signal mixer 125) in the feedback control unit. For N=1000, the RF filter used here may be a 1% bandpass filter centered around 10 GHz. A signal amplifier 123 such as an RF amplifier may be connected to the output of the filter 121 to amplify the 10 GHz harmonic signal to a higher level for more sensitive phase detection at the signal mixer 125.

The signal mixer 125 includes two input ports for receiving the amplified signal at the harmonic frequency Nfp from the amplifier 123 and the reference signal 140 at the same harmonic frequency Nfp as the local oscillator (LO) signal, respectively. A signal generator may be used to generate the reference signal 140 at the harmonic frequency Nfp. A signal amplifier 130 may be used to amplify the reference signal 140 prior to the mixing at the signal mixer 125 and may be a limiting amplifier with a fixed output power level (e.g., 10 dBm). The signal mixer produces an error voltage $\Delta V = V p \cdot \sin(2 \pi f \Delta t)$ where $\Delta t$ is the timing difference between the signal at the harmonic frequency from the photodetector 110 and the reference signal 140. A signal integrator 127 is connected at the output of the signal mixer 125 to integrate the error voltage over time. Next, a high-voltage amplifier 129 may be used to amplify the output signal from the integrator 127 to produce the feedback control signal 122. Notably, because the reference frequency of the local oscillator signal or the reference signal 140 is set to be the same as the center frequency of the filter 121 without a frequency offset, the error voltage $\Delta V$, which is the beat signal between the amplified signal at the harmonic frequency Nfp from the amplifier 123 and the reference signal 140 at the output of the mixer 125, is a low-frequency signal. As such, it is desirable to select electronic components in the feedback loop (e.g., an amplifier) to have low noise for DC signals and in low frequencies of the error voltage signal.

The laser 101 has a control mechanism that responds to the feedback control signal 122 and adjust the optical path length of the laser cavity to minimize the timing jitter detected by the signal mixer 125. A piezo transducer, for example, may be used to change the optical path length of the laser as part of the control mechanism. The pulse repetition frequency fp is adjusted when the optical path length of the laser is adjusted. The above feedback control can be used to achieve very low timing jitters over a long term.

In implementing the system 100, the signal integrator 127 may be specifically configured to have low noise and a low DC drift over long term (10-100 minutes). The high voltage amplifier 129 may be configured to have a wide bandwidth. In the laser 101, an electromagnetic screening element may be used to screen the laser 101 from the electromagnetic field generated by the high voltage amplifier 129 and its high voltage supply, thus eliminating or minimizing the harmful interference toward the phase locked loop.

FIG. 2 shows an example of a passively mode-locked fiber laser 200 which may be used as the laser 101 in FIG. 1. The fiber laser 200 uses a Faraday rotator mirror 201 and a mirror 202 to form a Fabry-Perot cavity as the laser resonator. Optical fiber, e.g., single-mode fiber (SMF) is used to construct the optical path in the laser resonator. A piezo transducer is engaged to the fiber as a fiber stretcher to change the length of the fiber in response to the control signal 122 from the feedback control unit 120 in FIG. 1 to adjust the optical path length of the laser 200 to lock the laser to the reference frequency at Nfp and thus minimize the timing jitter.

As illustrated, a doped fiber segment 210 (e.g., Er-doped fiber) may be used as the optical gain medium to produce the laser gain in the laser resonator. A wavelength-selective optical coupler 230 is coupled to the fiber to inject a pump beam from a pump source 240 to optically excite the doped active ions in the doped fiber 210 for generating the laser action at a laser wavelength longer than the pump wavelength. A wavelength division multiplexing (WDM) coupler, for example, may be used to couple the pump and to transmit the laser light in the laser resonator. A saturable absorber made of a nonlinear optical material is placed in the optical path of the laser resonator to effectuate the passive mode locking. This saturable absorber is shown as an integrated unit with the end mirror. A semiconductor saturable absorber may be used for self start mode-locking.

A fiber coupler 250, e.g., a 4-port fiber coupler, is coupled to the fiber in the laser resonator as an output optical coupler to produce two laser outputs. One laser output is used as the output of the laser 200 where an optical isolator 270 and optical output port are used as the output interface. The other laser output is directed to the photodetector or optical receiver 110 which is used for the feedback control unit 120 as shown in FIG. 1. The fiber in the laser resonator may have multiple segments that are joined together. In this example, a segment of single-mode fiber 220 may be used as part of the fiber in the laser resonator and is engaged to the piezo transducer fiber stretcher 221.

Figure 3:
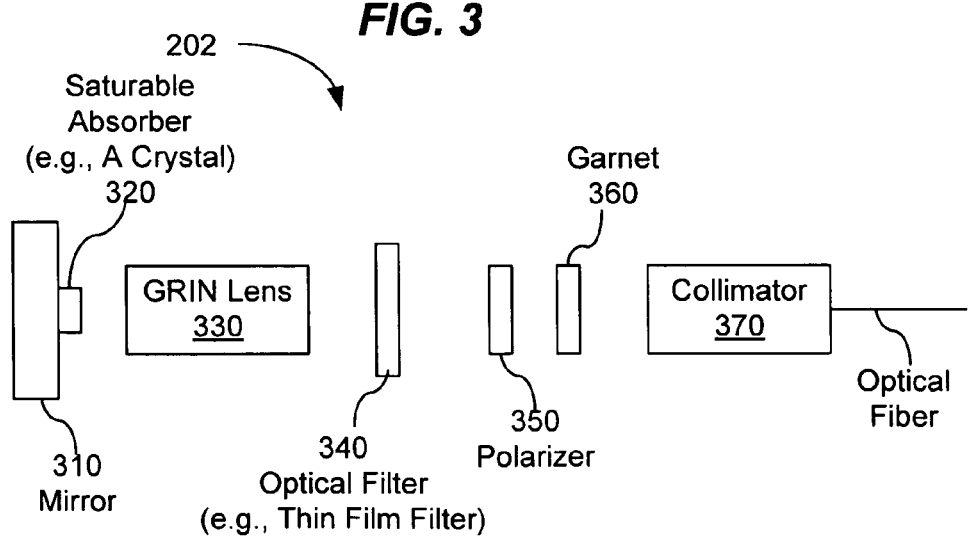
FIG. 3 further shows an example of a saturable absorber and a mirror suitable for the laser in FIG. 2.

FIG. 3 further shows one exemplary implementation of the saturable absorber 320 and the mirror 310 shown as a unit 202 in FIG. 2. The unit 202 includes a GRIN lens 330 which focuses light from the fiber to the saturable absorber 320 and collimates and couples the reflected laser light from the mirror 310 and the saturable absorber 320 to the fiber. An optical filter 340 is also included in the unit 202 to transmit light at the laser wavelength and reject light at the pump wavelength and other wavelengths. In addition, an optical polarizer 350 is used to control the polarization of the laser light and a polarization rotator 360 such as a garnet crystal Faraday rotator may be used to compensate for a drift in the polarization caused by the fiber within the laser resonator. The combination of elements 360 and 201 is used to compensate for the polarization fluctuation in the single mode EDF and other single mode fiber in the cavity.

Figure 4:
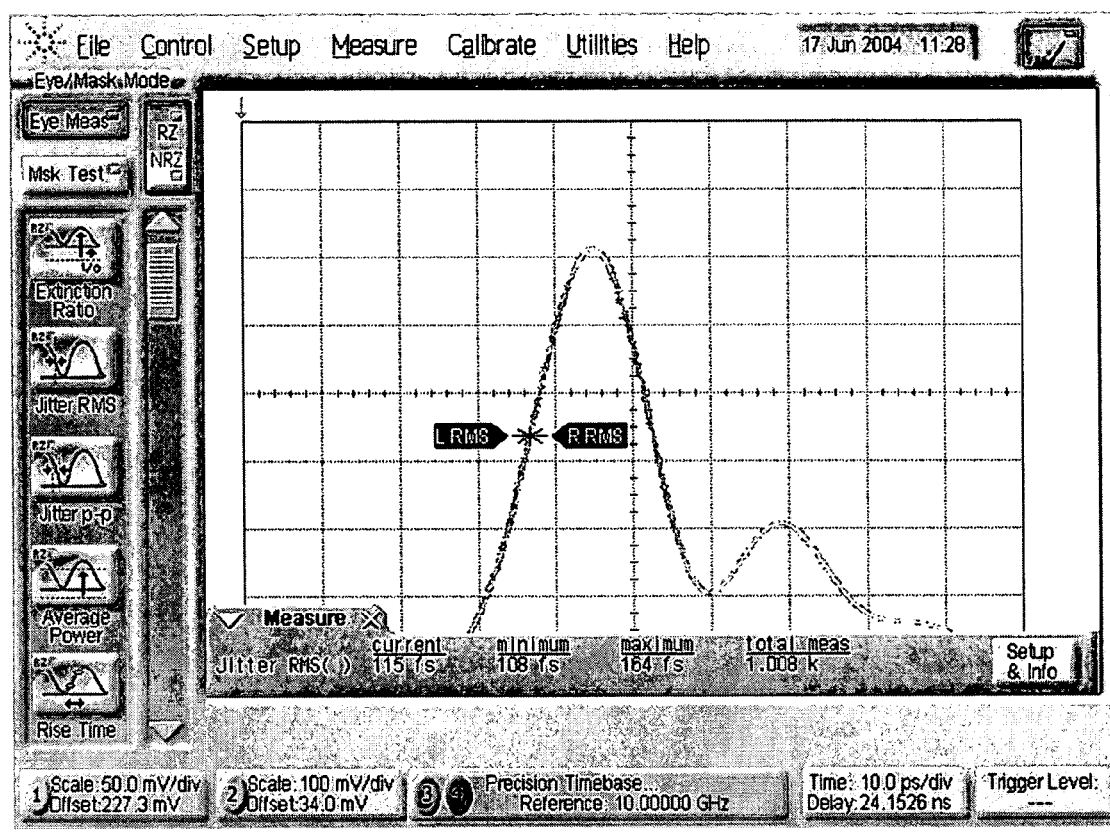
FIG. 4 shows a measurement of the timing jitter over 10 minutes of the laser output at a pulse repetition frequency of 10 MHz from a mode-locked fiber laser which is phase locked to a RF clock at high harmonics of 10 GHz, where the laser is based on the designs shown in FIGS. 1, 2 and 3.

FIG. 4 shows the jitter measurement of an output pulse display on a high speed oscilloscope triggered by an RF clock signal at 10 GHz from a phase-locked passively mode-locked fiber laser with a pulse repetition frequency at 10 MHz based on the designs in FIGS. 1 and 2. The trace shown here was obtained from a high speed oscilloscope with a bandwidth of 30 GHz. This oscilloscope has a build-in high-speed photodetector which can detect optical pulses directly and display the detected signals on the screen. The oscilloscope also includes a build-in program to analyze the timing jitter of the waveform of the detected pulses. As shown in FIG. 4, the measured timing jitter of the mode-locked laser under test has a mean value of 108 fs over a measurement time of several minutes. This timing jitter is significantly less than over the timing jitter at about 1 to 2 ps in other passively mode-locked lasers using a phase-locking feedback loop at the pulse repetition rate or frequency.

Various passively mode-locked lasers may be used as the laser 101 in FIG. 1. For example, the lasers described in U.S. Pat. Nos. 5,448,579, 6,097,741, 6,373,867 and 6,570,892 may be used as the laser 101 in FIG. 1 and are incorporated by reference in their entirety as part of the specification of this application.

Figure 5:
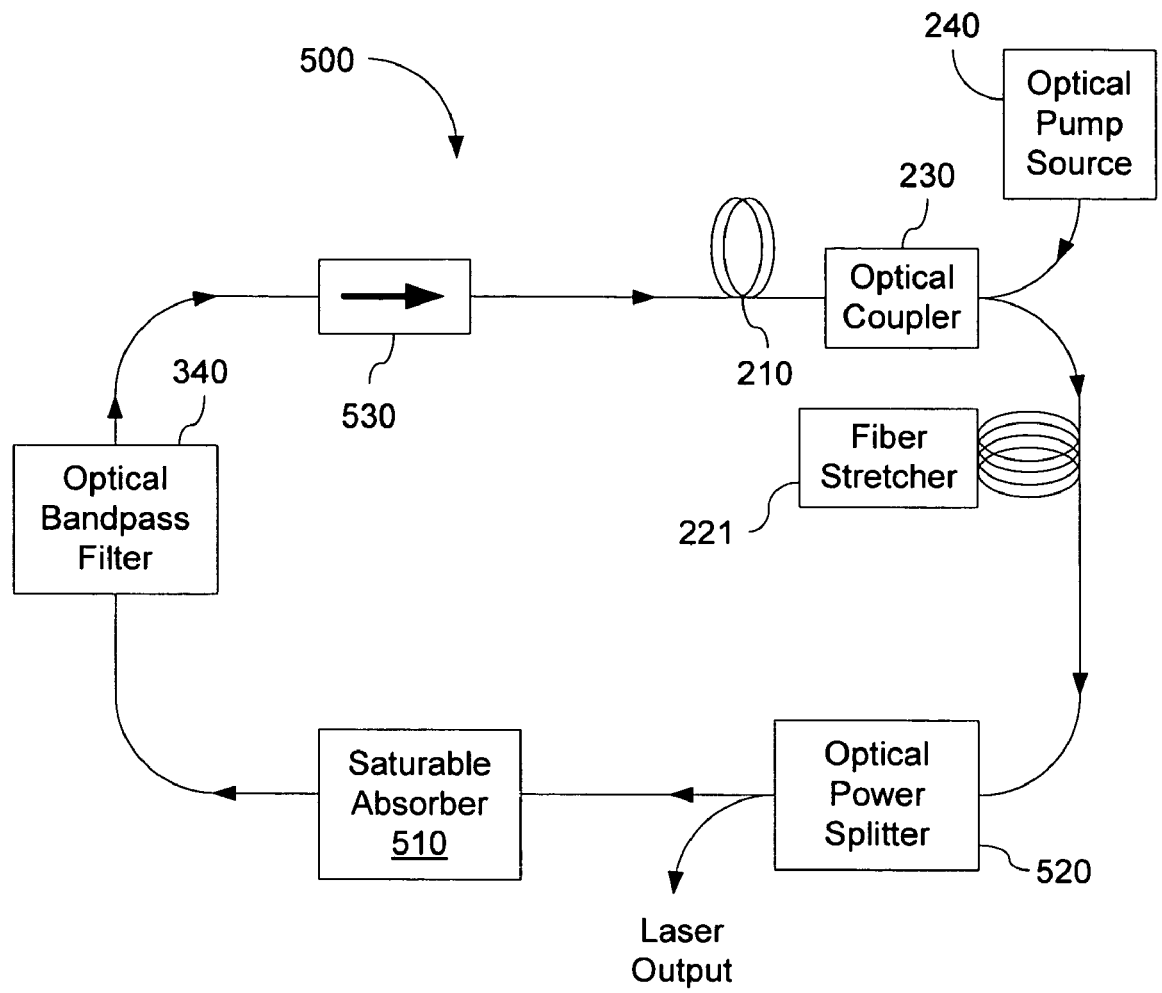
FIG. 5 shows one exemplary passively mode-locked fiber ring laser suitable for implementing the system in FIG. 1.

In addition, passively mode-locked lasers using a saturable absorber in a ring laser cavity may also be used as the laser 101 in FIG. 1. FIG. 5 shows one example of a passively mode-locked fiber ring laser 500 where a staurable absorber 510 is in the fiber ring to effectuate the passive mode locking. An optical power splitter 520 is used to produce the laser output. A part of the laser output is then used for the feedback control shown in FIG. 1. An optical isolator 530 may be used in the fiber ring to ensure that the laser pulses circulate in only one direction within the ring. U.S. Pat. No. 5,436,925 describe other passively mode-locked fiber ring lasers and is incorporated by reference in its entirety as part of the specification of this application.

The piezo transducer in the above examples can be used to achieve fine adjustment of the optical path length of the laser cavity (e.g., an adjustment on the order of nanometers) and very fast frequency response (e.g., at rates of kHz). Such a piezo transducer can effectively make fine adjustments in the laser for the phase loop lock operation in FIG. 1. Many piezo transducers have limited adjustment ranges, e.g., a relative change of about for 0-1000 V and thus can be used only to lock and tune the laser in a very narrow frequency range (e.g., $5 \times 10^{-5}$). As an example, when the laser temperature changes, the index of optical fiber may change at $1.1 \times 10^{-5}$ per degree C. If the frequency of the laser can be tuned by the PZT relative to an initial laser frequency by $5 \times 10^{-5}$, the PZT can only compensate for a change in the pulse repetition rate caused by a change in temperature for about 5 degrees.

Figure 6:
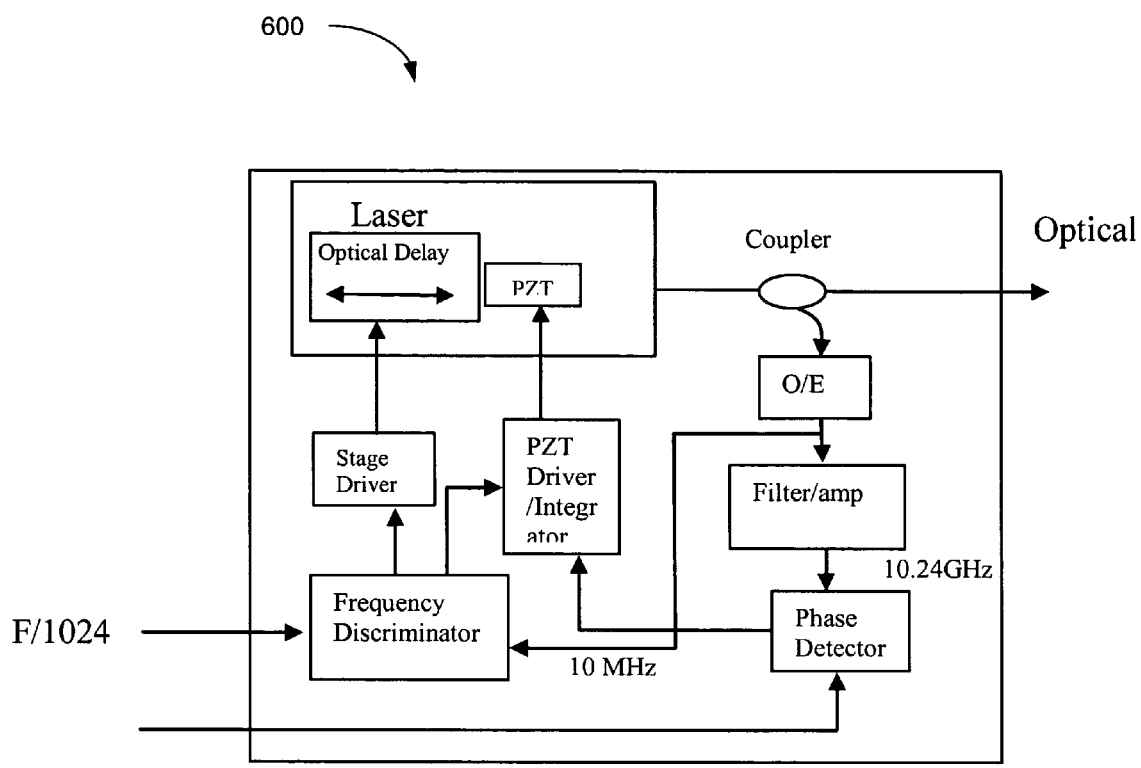
FIG. 6 shows an implementation of the system in FIG. 1 where the optical path length of the passively mode-locked laser is coarsely controlled by a variable optical delay element and finely controlled by a piezo actuator, where the feedback control signal based on the signal component at the high harmonic frequency of the laser pulse repetition frequency is used for the fine control of the laser path length of the laser.

To increase the tuning range of the laser 101 to a wider range (e.g., $10^{-2}$ or more), a tunable or variable optical delay line may be added in the laser as a coarse tuning mechanism and the PZT tuning is used as the fine tuning and locking mechanism of the laser. FIG. 6 illustrates one implementation of a passively mode-locked laser system 600 having both a tunable optical delay line 610 and a PZT element 620 in the laser 101. As an example, the pulse repetition frequency of 10 MHz and the harmonic frequency at 10.24 GHz as the reference frequency are shown. The laser repetition coarse tuning over a large range is accomplished by the tunable optical delay line 610. The high speed and fine tuning of the laser pulse repetition rate for phase locking to the external clock with low timing jitter is done by the PZT 620. The Frequency discriminator 630 provides a first control signal to control the optical delay line 610 for the coarse tuning and a second control signal to enable or disable the PZT driver 640. Frequency discriminator 630 instructs the optical delay line 610 to make appropriate adjustments when the difference between the RF clock frequency and the laser repetition rate is out of the PZT range and disable the PZT driver. When the difference between the RF clock frequency and the laser repetition rate is inside the PZT range, the frequency discriminator 630 instructs the optical delay line 610 to stop tuning and enables the PZT driver to adjust the PZT element. When the PZT driver is enabled, the laser is locked to the external clock with low jitter.

Figure 7:
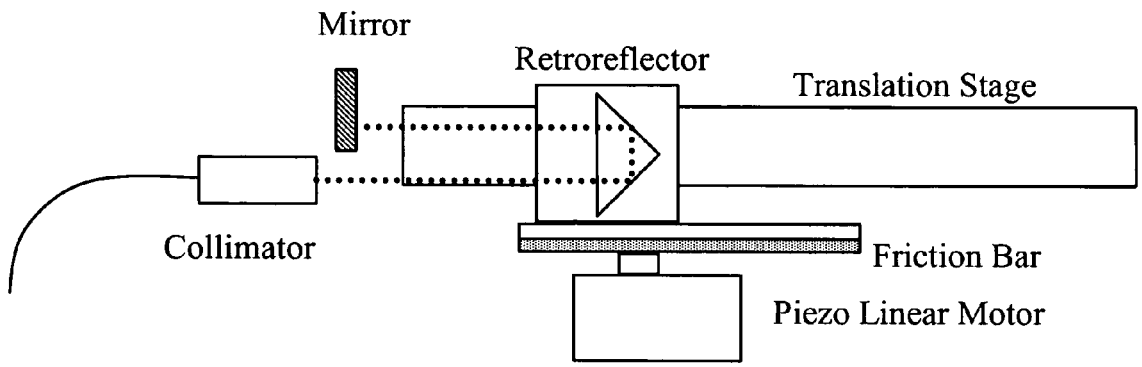
FIG. 7 shows one example of the variable optical delay element in FIG. 6 using a retroreflector.

FIG. 7 shows one example of the tunable optical delay line 610 using a retroreflector 710 between the end mirror 310 of the laser resonator and the fiber collimator 370 to adjust the optical path length of the laser. The retroreflector 710 is mounted on a translation stage and a linear motor is used to move the stage and the retroreflector 710 relative to the end mirror 310. The linear motor can be used here to achieve high speed tuning. As an alternative, a DC step motor with a lead screw may also be used to drive the translation stage. This delay line can achieve a fast tuning time less than 1 second over a wide tuning rage of about 15 cm under electrical control. As an example, various parameters for the optical delay line in FIG. 7 are given below: (1) The delay range is greater than 15 cm in the air; (2) The tuning speed is less than 0.7 sec over whole range and is less than 0.2 sec over a distance less than 1 mm; (3) The insertion loss is less than 1.5 dB with a variation less than 1.0 dB; And (4) the polarization state rotation for the single mode fiber is 90 degrees.

Figure 8:
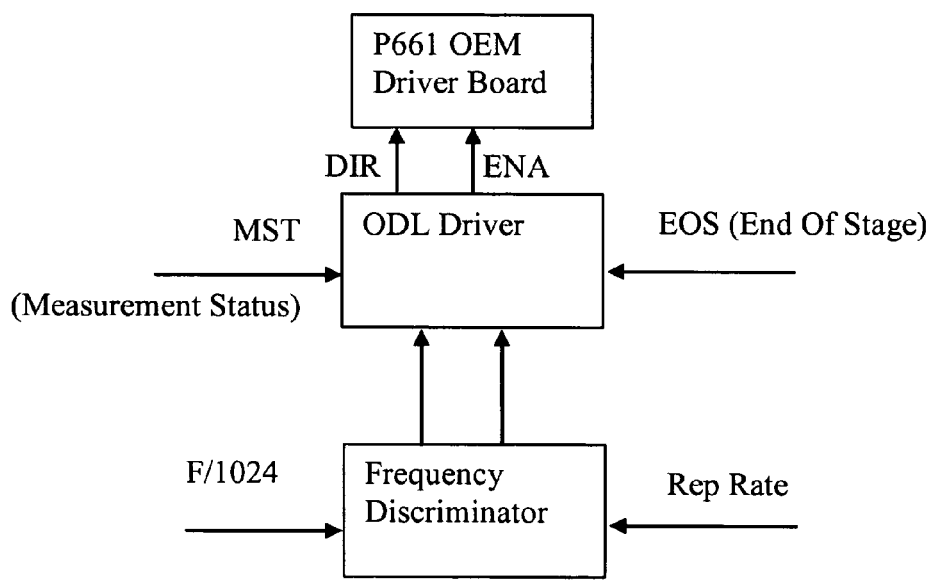
FIG. 8 shows an example of a control unit for controlling the optical delay element in FIG. 6.

FIG. 8 shows the driver control for the optical delay line in FIG. 7. A control algorithm is implemented to achieve fast and accurate adjustments.

The above phase-locking techniques based on a high harmonic reference frequency may also be implemented where the reference frequency of the reference signal 140 is positively or negatively offset from the harmonic frequency Nfp of the filter 121 by $f_{offset}$. FIG. 9 shows an example 900 with a modified harmonic frequency feedback control 310. The signal mixer 125 receives a reference signal 940 at the master clock frequency of $(Nfp+f_{offset})$. The beat signal between the filtered detector output and the reference signal 940 produced by the signal mixer 125 is at or near $f_{offset}$. A low noise amplifier 912 near $f_{offset}$ is connected at the output of the mixer 125 to amplify the beat signal. Then the amplified beat signal is mixed at a second signal mixer 914 with a second reference signal 916 at the frequency $f_{offset}$ to generate an error signal near DC. This error signal is then used to drive the integrator 127. Because the beat signal is amplified at the higher frequency $f_{offset}$, the 1/f noise near DC, which is usually strong, can be significantly reduced by setting the $f_{offset}$ to be sufficiently large.

Only a few implementations are disclosed. However, it is understood that variations, modifications and enhancements may be made.

What is claimed is:

1. A passively mode-locked laser device, comprising:
    a tunable passively mode-locked laser comprising a Fabry-Perot laser resonator that produces laser pulses and a laser control mechanism that controls an optical path length of the Fabry-Perot laser resonator to tune a pulse repetition frequency of the laser pulses;
    an optical detector to receive at least a portion of the laser pulses from the laser and to produce electronic pulses in response to the received laser pulses; and
    a feedback control circuit that extracts a monitor signal whose spectral range centers at a harmonic frequency of the pulse repetition frequency from the electronic pulses and processes the monitor signal to produce an error signal indicating a deviation between the harmonic frequency of the pulse repetition frequency of the laser pulses from either a reference harmonic frequency of a desired pulse repetition frequency in a reference signal, or a reference frequency that is offset from the reference harmonic frequency, wherein the feedback control circuit applies the error signal to the laser control mechanism which, in response, tunes the pulse repetition frequency of the laser pulses to reduce the deviation,
    wherein the feedback control circuit comprises:
    a signal filter that filters the electronic pulses in frequency and extracts signal spectral components around the harmonic frequency of the pulse repetition frequency within a predetermined bandwidth to produce the monitor signal, wherein the signal filter rejects signals at the pulse repetition frequency;
    a signal amplifier that amplifies the monitor signal to output an amplified monitor signal at the harmonic frequency of the pulse repetition frequency;
    a signal mixer that is directly connected to the signal amplifier and mixes the amplified monitor signal at the harmonic frequency of the pulse repetition frequency and the reference signal to produce the error signal; and
    a signal integrator that integrates an output from the signal mixer and to produce the error signal,
    wherein the Fabry-Perot laser resonator comprises:
    first and second optical reflectors separated from each other to reflect the laser pulses therebetween;
    an optical gain medium located in an optical path between the first and second optical reflectors;
    an optical element located in an optical path between the first and second optical reflectors to lock phases of different longitudinal resonator modes to produce the laser pulses; and
    optical fiber forming at least part of an optical path between the first and second optical reflectors, and comprising a doped section as the optical gain medium; and
    wherein the laser control mechanism comprises:
    a variable optical delay element in an optical path of the Fabry-Perot laser resonator to coarsely adjust the optical path length of the Fabry-Perot laser resonator; and
    a piezo electrical actuator in an optical path of the Fabry-Perot laser resonator to finely adjust the optical path length of the Fabry-Perot laser resonator.

2. A device as in claim 1, wherein the feedback control circuit further comprises a second signal amplifier that amplifies the error signal from the signal integrator.

3. A device as in claim 1, wherein the optical element is an optical saturable absorber.

4. A device as in claim 1, wherein the optical element is made of a semiconductor material.

5. A device as in claim 1, wherein the variable optical delay element control mechanism comprises:
    an optical retroreflector; and
    a translation stage engaged to the optical retroreflector and to move a position of the optical retroreflector,
    wherein the pieze electrical actuator is also engaged to the retroreflector to change the position of the optical retroreflector.

6. A method, comprising:
    converting laser pulses at a pulse repetition frequency generated from a tunable passively mode-locked laser having a Fabry-Perot resonator into electrical pulses, wherein the Fabry-Perot laser resonator comprises (1) first and second optical reflectors separated from each other to reflect the laser pulses therebetween, (2) an optical gain medium located in an optical path between the first and second optical reflectors, (3) an optical element located in an optical path between the first and second optical reflectors to lock phases of different longitudinal resonator modes to produce the laser pulses, and (4) optical fiber forming at least part of an optical path between the first and second optical reflectors and comprising a doped section as the optical gain medium;
    filtering the electrical pulses in frequency to obtain a monitor signal at a harmonic frequency of the pulse repetition frequency without signals at the pulse repetition frequency;
    mixing the monitor signal at the harmonic frequency of the pulse repetition frequency with a reference signal at a reference frequency related to a harmonic frequency of a desired pulse repetition frequency to produce a beat signal representing a timing jitter in the laser pulses;
    using a signal integrator to average the beat signal in time to produce an error signal representing the timing jitter in the beat signal; and
    adjusting the laser to change the pulse repetition frequency of the laser pulses in response to the timing jitter in the error signal to reduce the timing jitter, wherein the adjusting includes:
    adjusting a variable optical delay element in an optical path of the Fabry-Perot laser resonator to coarsely adjust the optical path length of the Fabry-Perot laser resonator, and
    operating a piezo electrical actuator in an optical path of the Fabry-Perot laser resonator to finely adjust the optical path length of the Fabry-Perot laser resonator.

7. A method as in claim 6, further comprising setting the harmonic frequency to amplify a magnitude of the error signal representing the timing jitter to be greater than a noise level in the signal integrator.

8. A method as in claim 6, further comprising amplifying the monitor signal after the filtering in frequency prior to the mixing.

9. A method as in claim 6, further comprising adjusting an optical path length of the laser to change the pulse repetition frequency.

10. The method as in claim 6, comprising:
    selecting the reference frequency of the reference signal to be offset from the harmonic frequency.

11. The method as in claim 6, comprising:
    selecting the reference frequency of the reference signal to be equal to the harmonic frequency.

* * * * *

UNITED STATES PATENT AND TRADEMARK OFFICE
CERTIFICATE OF CORRECTION

PATENT NO. : 7,602,825 B1  
APPLICATION NO. : 11/223657  
DATED : October 13, 2009  
INVENTOR(S) : Anthony Hong Lin and Jingjun Zhao It is certified that error appears in the above-identified patent and that said Letters Patent is hereby corrected as shown below:

Title Page, Item (56) References Cited, Other Publications,
Column 2, line 1, delete "Femtosccond" and insert -- Femtosecond --;

Column 10, line 10, delete "pieze" annd insert -- piezo --.

Signed and Sealed this

Fifteenth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,602,825 B1  
APPLICATION NO. : 11/223657  
DATED : October 13, 2009  
INVENTOR(S) : Lin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 111 days.

Signed and Sealed this

Fifth Day of October, 2010

David J. Kappos  
*Director of the United States Patent and Trademark Office*